(12) United States Patent
Srisuresh et al.

(10) Patent No.: US 8,194,673 B2
(45) Date of Patent: *Jun. 5, 2012

(54) POLICY BASED NETWORK ADDRESS TRANSLATION

(75) Inventors: Pyda Srisuresh, Mill Valley, CA (US); Marco A. Murgia, Los Gatos, CA (US); Ramakanth Gunuganti, Sunnyvale, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/795,496

(22) Filed: Jun. 7, 2010

(65) Prior Publication Data

US 2010/0251335 A1    Sep. 30, 2010

Related U.S. Application Data

(63) Continuation of application No. 10/857,225, filed on May 28, 2004, now Pat. No. 7,760,729.

(60) Provisional application No. 60/473,964, filed on May 28, 2003.

(51) Int. Cl.
*H04L 12/28* (2006.01)

(52) U.S. Cl. .................................. 370/392; 370/401

(58) Field of Classification Search .................. None
See application file for complete search history.

(56) References Cited

U.S. PATENT DOCUMENTS

| | | | |
|---|---|---|---|
| 5,999,525 A | 12/1999 | Krishnaswamy et al. | |
| 6,006,264 A | 12/1999 | Colby et al. | |
| 6,023,724 A | 2/2000 | Bhatia et al. | |
| 6,058,431 A * | 5/2000 | Srisuresh et al. | 709/245 |
| 6,104,700 A * | 8/2000 | Haddock et al. | 370/235 |
| 6,173,325 B1 | 1/2001 | Kukreja | |
| 6,249,801 B1 | 6/2001 | Zisapel et al. | |
| 6,289,382 B1 | 9/2001 | Bowman-Amuah | |
| 6,321,336 B1 | 11/2001 | Applegate et al. | |
| 6,321,337 B1 | 11/2001 | Reshef et al. | |
| 6,324,582 B1 | 11/2001 | Sridhar et al. | |
| 6,332,163 B1 | 12/2001 | Bowman-Amuah | |
| 6,333,931 B1 | 12/2001 | LaPier et al. | |
| 6,339,832 B1 | 1/2002 | Bowman-Amuah | |
| 6,360,265 B1 | 3/2002 | Falck et al. | |
| 6,389,462 B1 | 5/2002 | Cohen et al. | |
| 6,415,329 B1 | 7/2002 | Gelman et al. | |
| 6,434,568 B1 | 8/2002 | Bowman-Amuah | |
| 6,434,618 B1 | 8/2002 | Cohen et al. | |

(Continued)

FOREIGN PATENT DOCUMENTS

EP    1 343 296 A2    9/2003

(Continued)

OTHER PUBLICATIONS

International Preliminary Report on Patentability for PCT/US2004/017012, issued on Dec. 1, 2005.

(Continued)

*Primary Examiner* — Hong Cho
(74) *Attorney, Agent, or Firm* — Foley & Lardner LLP; Christopher J. McKenna

(57) ABSTRACT

A system and method is described for providing policy-based Network Address Translation (NAT) configurations wherein each user/resource policy within a network protection device may use a different set of address translation mappings.

20 Claims, 7 Drawing Sheets

U.S. PATENT DOCUMENTS

| | | |
|---|---|---|
| 6,434,628 B1 | 8/2002 | Bowman-Amuah |
| 6,438,594 B1 | 8/2002 | Bowman-Amuah |
| 6,442,748 B1 | 8/2002 | Bowman-Amuah |
| 6,477,580 B1 | 11/2002 | Bowman-Amuah |
| 6,477,665 B1 | 11/2002 | Bowman-Amuah |
| 6,484,206 B2 | 11/2002 | Crump et al. |
| 6,496,850 B1 | 12/2002 | Bowman-Amuah |
| 6,496,935 B1 | 12/2002 | Fink et al. |
| 6,502,213 B1 | 12/2002 | Bowman-Amuah |
| 6,523,027 B1 | 2/2003 | Underwood |
| 6,529,909 B1 | 3/2003 | Bowman-Amuah |
| 6,529,948 B1 | 3/2003 | Bowman-Amuah |
| 6,539,396 B1 | 3/2003 | Bowman-Amuah |
| 6,549,949 B1 | 4/2003 | Bowman-Amuah |
| 6,550,057 B1 | 4/2003 | Bowman-Amuah |
| 6,571,282 B1 | 5/2003 | Bowman-Amuah |
| 6,571,285 B1 | 5/2003 | Groath et al. |
| 6,578,068 B1 | 6/2003 | Bowman-Amuah |
| 6,584,569 B2 | 6/2003 | Reshef et al. |
| 6,601,192 B1 | 7/2003 | Bowman-Amuah |
| 6,601,233 B1 | 7/2003 | Underwood |
| 6,601,234 B1 | 7/2003 | Bowman-Amuah |
| 6,606,660 B1 | 8/2003 | Bowman-Amuah |
| 6,606,744 B1 | 8/2003 | Mikurak |
| 6,609,128 B1 | 8/2003 | Underwood |
| 6,615,199 B1 | 9/2003 | Bowman-Amuah |
| 6,615,253 B1 | 9/2003 | Bowman-Amuah |
| 6,615,357 B1 | 9/2003 | Boden et al. |
| 6,633,878 B1 | 10/2003 | Underwood |
| 6,636,242 B2 | 10/2003 | Bowman-Amuah |
| 6,640,238 B1 | 10/2003 | Bowman-Amuah |
| 6,640,244 B1 | 10/2003 | Bowman-Amuah |
| 6,640,249 B1 | 10/2003 | Bowman-Amuah |
| 6,665,702 B1 | 12/2003 | Zisapel et al. |
| 6,671,818 B1 | 12/2003 | Mikurak |
| 6,683,873 B1 | 1/2004 | Kwok et al. |
| 6,687,732 B1 | 2/2004 | Bector et al. |
| 6,691,227 B1 | 2/2004 | Neves et al. |
| 6,697,377 B1 | 2/2004 | Ju et al. |
| 6,697,824 B1 | 2/2004 | Bowman-Amuah |
| 6,704,873 B1 | 3/2004 | Underwood |
| 6,715,145 B1 | 3/2004 | Bowman-Amuah |
| 6,718,359 B2 | 4/2004 | Zisapel et al. |
| 6,718,535 B1 | 4/2004 | Underwood |
| 6,725,253 B1 | 4/2004 | Okano et al. |
| 6,731,625 B1 | 5/2004 | Eastep et al. |
| 6,735,691 B1 | 5/2004 | Capps et al. |
| 6,742,015 B1 | 5/2004 | Bowman-Amuah |
| 6,742,045 B1 | 5/2004 | Albert et al. |
| 6,760,775 B1 | 7/2004 | Anerousis et al. |
| 6,772,347 B1 | 8/2004 | Xie et al. |
| 6,775,692 B1 | 8/2004 | Albert et al. |
| 6,801,528 B2 * | 10/2004 | Nassar .......... 370/389 |
| 6,826,627 B2 | 11/2004 | Sjollema et al. |
| 6,832,322 B1 | 12/2004 | Boden et al. |
| 6,842,906 B1 | 1/2005 | Bowman-Amuah |
| 6,871,346 B1 | 3/2005 | Kumbalimutt et al. |
| 6,880,086 B2 | 4/2005 | Kidder et al. |
| 6,891,830 B2 | 5/2005 | Curtis |
| 6,904,449 B1 | 6/2005 | Quinones |
| 6,909,708 B1 | 6/2005 | Krishnaswamy et al. |
| 6,920,502 B2 | 7/2005 | Araujo et al. |
| 6,931,411 B1 | 8/2005 | Babiskin et al. |
| 6,934,288 B2 | 8/2005 | Dempo |
| RE38,902 E * | 11/2005 | Srisuresh et al. ........... 709/245 |
| 6,985,901 B1 | 1/2006 | Sachse et al. |
| 6,996,628 B2 | 2/2006 | Keane et al. |
| 6,996,631 B1 | 2/2006 | Aiken et al. |
| 7,000,012 B2 | 2/2006 | Moore et al. |
| 7,028,333 B2 | 4/2006 | Tuomenoksa et al. |
| 7,028,334 B2 | 4/2006 | Tuomenoksa |
| 7,047,424 B2 | 5/2006 | Bendinelli et al. |
| 7,072,807 B2 | 7/2006 | Brown et al. |
| 7,085,854 B2 | 8/2006 | Keane et al. |
| 7,093,280 B2 | 8/2006 | Ke et al. |
| 7,100,195 B1 | 8/2006 | Underwood |
| 7,102,996 B2 | 9/2006 | Amdahl et al. |
| 7,113,962 B1 | 9/2006 | Kee et al. |
| 7,114,180 B1 | 9/2006 | DeCaprio |
| 7,117,530 B1 | 10/2006 | Lin |
| 7,123,613 B1 | 10/2006 | Chawla et al. |
| 7,124,101 B1 | 10/2006 | Mikurak |
| 7,130,807 B1 | 10/2006 | Mikurak |
| 7,136,645 B2 | 11/2006 | Hanson et al. |
| 7,155,515 B1 | 12/2006 | Brown et al. |
| 7,162,509 B2 | 1/2007 | Brown et al. |
| 7,181,766 B2 | 2/2007 | Bendinelli et al. |
| 7,200,530 B2 | 4/2007 | Brown et al. |
| 7,216,173 B2 | 5/2007 | Clayton et al. |
| 7,227,872 B1 | 6/2007 | Biswas et al. |
| 7,260,649 B1 * | 8/2007 | Somasundaram et al. .... 709/245 |
| 7,272,853 B2 | 9/2007 | Goodman et al. |
| 7,315,541 B1 * | 1/2008 | Housel et al. ........... 370/392 |
| 7,317,717 B2 | 1/2008 | Pankajakshan et al. |
| 7,318,100 B2 | 1/2008 | Demmer et al. |
| 7,334,049 B1 | 2/2008 | Somasundaram et al. |
| 7,385,924 B1 | 6/2008 | Riddle |
| 7,395,335 B2 | 7/2008 | Brown et al. |
| 7,398,552 B2 | 7/2008 | Pardee et al. |
| 7,464,264 B2 | 12/2008 | Goodman et al. |
| 7,512,702 B1 | 3/2009 | Srivastava et al. |
| 2001/0016914 A1 * | 8/2001 | Tabata ........... 713/201 |
| 2001/0037387 A1 | 11/2001 | Gilde et al. |
| 2001/0047406 A1 | 11/2001 | Araujo et al. |
| 2002/0023152 A1 * | 2/2002 | Oguchi ........... 709/223 |
| 2002/0029285 A1 | 3/2002 | Collins |
| 2002/0032725 A1 | 3/2002 | Araujo et al. |
| 2002/0032798 A1 | 3/2002 | Xu |
| 2002/0038339 A1 | 3/2002 | Xu |
| 2002/0042875 A1 | 4/2002 | Shukla |
| 2002/0073061 A1 | 6/2002 | Collins |
| 2002/0081971 A1 | 6/2002 | Travostino |
| 2002/0083175 A1 | 6/2002 | Afek et al. |
| 2002/0103846 A1 | 8/2002 | Zisapel et al. |
| 2002/0106005 A1 | 8/2002 | Motiwala et al. |
| 2002/0138618 A1 | 9/2002 | Szabo |
| 2002/0142774 A1 | 10/2002 | Saint-Hilaire et al. |
| 2002/0147822 A1 | 10/2002 | Susai et al. |
| 2002/0152373 A1 | 10/2002 | Sun et al. |
| 2002/0165960 A1 * | 11/2002 | Chan ........... 709/225 |
| 2002/0169887 A1 | 11/2002 | MeLampy et al. |
| 2002/0191612 A1 | 12/2002 | Curtis |
| 2002/0199007 A1 | 12/2002 | Clayton et al. |
| 2003/0014623 A1 | 1/2003 | Freed et al. |
| 2003/0014628 A1 | 1/2003 | Freed et al. |
| 2003/0041091 A1 | 2/2003 | Cheline et al. |
| 2003/0041167 A1 | 2/2003 | French et al. |
| 2003/0046586 A1 | 3/2003 | Bheemarasetti et al. |
| 2003/0046587 A1 | 3/2003 | Bheemarasetti et al. |
| 2003/0055962 A1 | 3/2003 | Freund et al. |
| 2003/0067874 A1 * | 4/2003 | See et al. ........... 370/230.1 |
| 2003/0084162 A1 | 5/2003 | Johnson et al. |
| 2003/0088788 A1 | 5/2003 | Yang |
| 2003/0093691 A1 | 5/2003 | Simon et al. |
| 2003/0110192 A1 | 6/2003 | Valente et al. |
| 2003/0123481 A1 | 7/2003 | Neale et al. |
| 2003/0131079 A1 | 7/2003 | Neale et al. |
| 2003/0149899 A1 | 8/2003 | Boden et al. |
| 2003/0154283 A1 * | 8/2003 | Brown ........... 709/226 |
| 2003/0182423 A1 | 9/2003 | Shafir et al. |
| 2003/0182431 A1 | 9/2003 | Sturniolo et al. |
| 2003/0188001 A1 | 10/2003 | Eisenberg et al. |
| 2003/0191799 A1 | 10/2003 | Araujo et al. |
| 2003/0195984 A1 | 10/2003 | Zisapel et al. |
| 2003/0198189 A1 | 10/2003 | Roberts et al. |
| 2003/0212776 A1 | 11/2003 | Roberts et al. |
| 2003/0217126 A1 | 11/2003 | Polcha et al. |
| 2003/0223361 A1 | 12/2003 | Hussain et al. |
| 2004/0006643 A1 | 1/2004 | Dolson et al. |
| 2004/0059942 A1 | 3/2004 | Xie |
| 2004/0073707 A1 | 4/2004 | Dillon |
| 2004/0078621 A1 | 4/2004 | Talaugon et al. |
| 2004/0095934 A1 | 5/2004 | Cheng et al. |
| 2004/0100907 A1 * | 5/2004 | Illikkal et al. ........... 370/235 |
| 2004/0100976 A1 | 5/2004 | Chang et al. |
| 2004/0177158 A1 | 9/2004 | Bauch et al. |
| 2004/0215746 A1 | 10/2004 | McCanne et al. |

| | | |
|---|---|---|
| 2004/0218611 A1 | 11/2004 | Kim |
| 2004/0249975 A1 | 12/2004 | Tuck et al. |
| 2004/0260922 A1 | 12/2004 | Goodman et al. |
| 2004/0268357 A1 | 12/2004 | Joy et al. |
| 2004/0268358 A1 | 12/2004 | Darling et al. |
| 2005/0013280 A1 | 1/2005 | Buddhikot et al. |
| 2005/0015507 A1 | 1/2005 | Chin |
| 2005/0022203 A1 | 1/2005 | Zisapel et al. |
| 2005/0089025 A1* | 4/2005 | Boyer et al. ........... 370/352 |
| 2005/0132030 A1 | 6/2005 | Hopen et al. |
| 2005/0141507 A1 | 6/2005 | Curtis |
| 2005/0195780 A1 | 9/2005 | Haverinen et al. |
| 2005/0198335 A1 | 9/2005 | Brown et al. |
| 2005/0210150 A1 | 9/2005 | Bahl |
| 2005/0286466 A1 | 12/2005 | Tagg et al. |
| 2006/0064478 A1 | 3/2006 | Sirkin |
| 2006/0080441 A1 | 4/2006 | Chen et al. |
| 2006/0236095 A1 | 10/2006 | Smith et al. |
| 2007/0067046 A1 | 3/2007 | Berg |
| 2007/0156852 A1 | 7/2007 | Sundarrajan et al. |
| 2007/0245409 A1 | 10/2007 | Harris et al. |
| 2007/0280232 A1 | 12/2007 | Dec et al. |
| 2008/0034416 A1 | 2/2008 | Kumar et al. |
| 2008/0046616 A1 | 2/2008 | Verzunov et al. |
| 2008/0225748 A1 | 9/2008 | Khemani et al. |
| 2008/0225753 A1 | 9/2008 | Khemani et al. |
| 2008/0229381 A1 | 9/2008 | Sikka et al. |
| 2008/0320151 A1 | 12/2008 | McCanne et al. |

FOREIGN PATENT DOCUMENTS

| | | |
|---|---|---|
| EP | 1 398 715 A2 | 3/2004 |
| WO | WO-2006/012612 | 2/2006 |

OTHER PUBLICATIONS

International Search Report for PCT/US2004/017012, mailed Dec. 1, 2004.

Written Opinion for PCT/US2004/017012, mailed on Dec. 1, 2004.

* cited by examiner

| 300 | 310 | 330 |
|---|---|---|
| | USER 1 (198.76.28.4) | |
| 198.76.29.2 | | 10.33.96.5 |
| 198.76.29.3 | | 10.33.96.9 |
| 198.76.29.4 | | 10.33.96.11 |
| | USER 2 (68.151.70.32) | |
| 198.76.29.5 | | 10.33.96.5 |
| 198.76.29.6 | | 10.33.96.9 |
| 198.76.29.7 | | 10.33.96.14 |
| 320 | ... | |

*FIG. 3*

| USER 1 (198.76.28.4) | | | |
|---|---|---|---|
| EXTERNAL USER IP ADDRESSES | EXTERNAL RESOURCE IP ADDRESSES | INTERNAL USER IP ADDRESSES | INTERNAL RESOURCE IP ADDRESSES | RESOURCE NAME |
| 198.76.28.4 | 198.76.29.2 | 10.33.96.2 | 10.33.96.5 | RESOURCE 1 |
| 198.76.28.4 | 198.76.29.3 | 10.33.96.2 | 10.33.96.9 | RESOURCE 2 |
| 198.76.28.4 | 198.76.29.4 | 10.33.96.2 | 10.33.96.11 | RESOURCE 3 |

*FIG. 5A*

| USER 2 (68.151.70.32) |||||
|---|---|---|---|---|
| EXTERNAL USER IP ADDRESSES | EXTERNAL RESOURCE IP ADDRESSES | INTERNAL USER IP ADDRESSES | INTERNAL RESOURCE IP ADDRESSES | RESOURCE NAME |
| 68.151.70.32 | 198.76.29.5 | 10.33.96.3 | 10.33.96.5 | RESOURCE 1 |
| 68.151.70.32 | 198.76.29.6 | 10.33.96.3 | 10.33.96.9 | RESOURCE 2 |
| 68.151.70.32 | 198.76.29.7 | 10.33.96.3 | 10.33.96.14 | RESOURCE 5 |
| | | | | |

POLICY BASED NETWORK ADDRESS TRANSLATION

RELATED APPLICATIONS AND CLAIM OF PRIORITY

This present application claims priority to and is a continuation of U.S. Non-Provisional application Ser. No. 10/857,225, entitled "Policy Based Network Address Translation", filed on May 28, 2004, which claims the benefit of and priority to U.S. Provisional Patent Application No. 60/473,964, filed May 28, 2003, both of which are incorporated herein by reference in their entirety. This patent application incorporates by reference in its entirety each of the following U.S. patent applications: 1) "Method and System for Identifying Bidirectional Packet Flow" filed on May 28, 2004, having U.S. application Ser. No. 10/857,703, now abandoned; 2) "Method, System and Software for State Signing of Internet Resources" filed on May 28, 2004, having U.S. application Ser. No. 10/857,536, now abandoned; and 3) "Multilayer Access Control Security System" filed on May 28, 2004, having U.S. application Ser. No. 10/857,224 and co-pending with the present application.

BACKGROUND OF THE INVENTION

Network Address Translation (NAT) is an Internet technology that was originally developed to work around the growing scarcity of Internet Protocol (IP) addresses on the Internet. The current, and most widely used, Internet Protocol (IPv4) supports more than four billion addresses. However, because of inefficient allocation of addresses, routing constraints, and the Internet's phenomenal growth, this number has proven insufficient. The NAT solution is to use private addresses on a company's (or homeowner's) internal network and only convert those internal addresses to globally routable IP addresses when communicating through a gateway (e.g., router, firewall, other switching or routing device) to hosts (other computers/servers) on the Internet. In some applications, hosts currently communicating will get their own globally routable IP address, while in other applications, as few as one globally routable IP address may be used for multiple internal hosts. Ideally, this translation will be invisible to the underlying networking applications and protocols. NAT functionality can also be exploited for its security features (internal IP addresses are effectively "hidden" to the external world) and has been employed in session redirection and load balancing.

There are many products available today that employ NAT functionality, including routers for business and home use, firewalls, and Internet/residential gateways. Some computer operating systems also implement NAT functionality so that a server or workstation running such an operating system can act as a NAT-enabled software router or firewall. Applications of NAT have been focused on address translations based on network structure, resource availability, and simple application requirements.

FIG. 1 illustrates an exemplary use of a NAT map (functionality) 100 within a NAT router 110 connecting an internal network 120 to the Internet 130. The internal network 120 includes the NAT router 110, an application server 140 and a file server 150. External users 160, 170 can connect to the internal network 120 via the Internet 130. The NAT map 100 includes a list of external IP addresses 180 and a list of internal IP addresses 190.

As is understood in the prior art, the first user 160 transmits packets to the externally known IP address for the application server 140 (196.28.43.2). With no regard for who the user is or what the resource is, the NAT router 110 receives the packets containing the externally known destination IP address 180 (196.28.43.2) and utilizes the NAT map 100 to translate the external address (196.28.43.2) to a corresponding internal IP address (10.33.96.5) 190 and routes the packets accordingly. The second user 170 sends packets to the file server 150 (using external IP address 196.29.74.4) and the NAT router 110 translates the external address to the internal IP address (10.33.96.9) and forwards to the file server 150. If the application server 140 or file server 150 communicates with an external user, the NAT router 110 utilizes the NAT map 100 to translate the source address from the internal IP address 190 (10.33.96.5 and 10.33.96.9 respectively) to the externally known IP address 180 (196.28.43.2 and 196.29.74.4) prior to forwarding the packets externally. The external users therefore do not know the internal IP addresses. Although as illustrated in FIG. 1 the user's addresses are not translated, the NAT map 100 may optionally perform user address translation.

Session flow, also referred to herein as flow, is well known to those skilled in the art and is described in detail in the Internet Engineering Task Force (IETF) Request for Comments (RFC) 2663, which is incorporated herein by reference. Session flow is a combination of inbound and outbound packets that form part of a session initiated in one direction. Packet flow is defined in RFC 2663 as the direction in which the packet has traveled with reference to a network interface. As an example, a session (session flow) initiated by a user on a server for telnet would consist of packet flows in both the inbound and outbound directions.

As network applications and Web application services have proliferated and corporate networks have become more distributed, there has been a growing need for more flexibility in address translation functionality. NAT is a process in which IP addresses are mapped from one group to another, transparent to end users. Network Address Port Translation (NAPT) is a method by which many network addresses and their TCP/UDP (Transmission Control Protocol/User Datagram Protocol) ports are translated into a single network address and its TCP/UDP ports. NAPT works well to share a single globally routable IP address when an internal user initiates the contact and receives a reply on the same port. The processes of NAT and NAPT are well known to those skilled in the art and are described in detail in ETF document RFC 3022, which is incorporated herein by reference. However, when multiple applications using the same well-known port (such as TCP port 443 for secure socket layer) are placed behind an NAPT enabled device some of the applications may become inoperative for inbound flows.

Other features of NAT have been developed, including the use of NATs for load sharing, where a session load can be distributed across a pool of servers, instead of directed to a single server. The use of NATs for load sharing is described in the IEETF document RFC 2391, which is incorporated herein by reference. A type of NAT has been developed for interfacing between end-nodes using version 6 of the Internet protocol (V6) trying to communicate with end-nodes using version 4 (V4) and vice versa. This type of Network Address Translation—Protocol Translation (NAT-PT) is described in RFC 2766, which is incorporated by reference herein.

The prior art systems essentially use address maps to provide address translations regardless of who the client is and what the service is. This limited flexibility results in unrestricted user access and uniform address translation. What is needed is a way to create and adjust network address translation configurations based on user and resource-specific network policies. Such capability would result in higher security based on user authorization, greater control of network resources and the general ability to vary network address translation for a wide range of purposes.

SUMMARY OF THE INVENTION

A network protection device (firewall or network access management system) may be responsible for establishing and enforcing packet traffic policies into and out of a corporate or home network. Each packet entering a piece of network protection equipment may be classified into a particular flow and, based on the established policies, either forwarded to a destination or dropped. In some cases, the source and/or destination addresses and ports may be modified for all packets in a particular flow. This may be done for a number of reasons, including security, load balancing, and to work around equipment failures. This rewriting of addresses and ports is referred to herein as "translation." The set of translations that are active at any particular time is called a NAT configuration.

In an advanced access management system, resources may be made available (authorized) for specific users at specific times and in user-specific ways. A "policy" may be defined by the precise rules for how a particular resource is made available to a particular user at a particular time. An advanced access management system may filter some or all packets entering the system based on all of the policies in force when the packet arrives. In one embodiment, each policy within an access management system may employ a different NAT configuration. In this way, the address translation may vary from policy to policy (user to user). In an embodiment, no two policies need carry the same set of NAT translation parameters. This allows for resources to be given customized access rules and address translation functionality for each user.

Before explaining at least one embodiment in detail, it is to be understood that the invention is not limited in its application to the details of construction and to the arrangements of the components set forth in the description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

Those skilled in the art will appreciate that the conception upon which this disclosure is based may readily be used as a basis for designing other structures, methods, and systems for carrying out the several purposes of the present invention.

BRIEF DESCRIPTION OF THE DRAWINGS

The accompanying drawings, which are incorporated in and form a part of the specification, illustrate embodiments of the present invention and, together with the description serve to explain the principles of the invention.

FIG. 3 illustrates an exemplary policy-based NAT map, according to one embodiment;

FIGS. 5A and 5B illustrate an exemplary policy-based NAT map, according to one embodiment.

DETAILED DESCRIPTION

Figure 1:
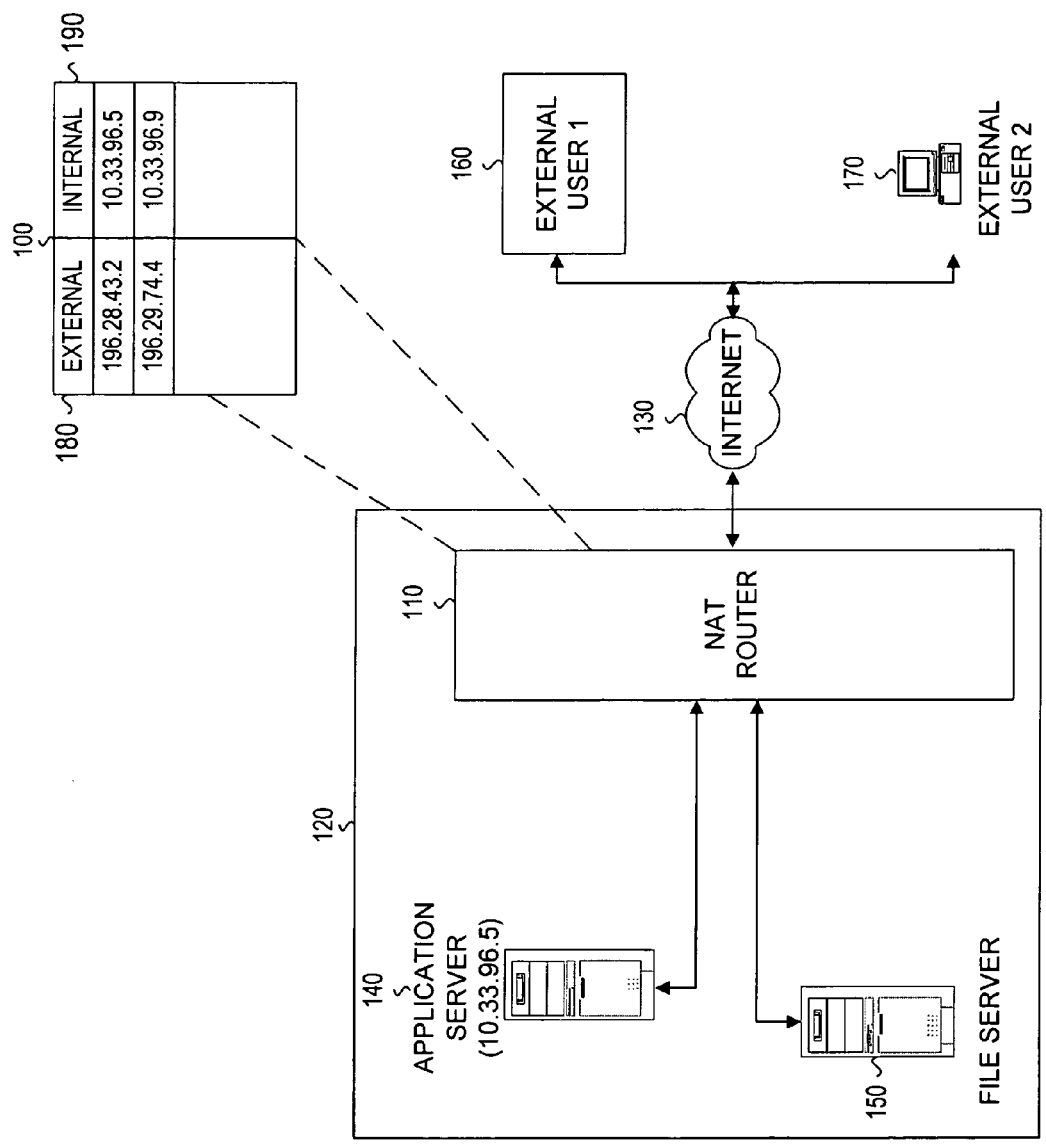
FIG. 1 illustrates an exemplary use of a NAT map within a router for inbound access to enterprise applications.

In describing an embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

Figure 2:
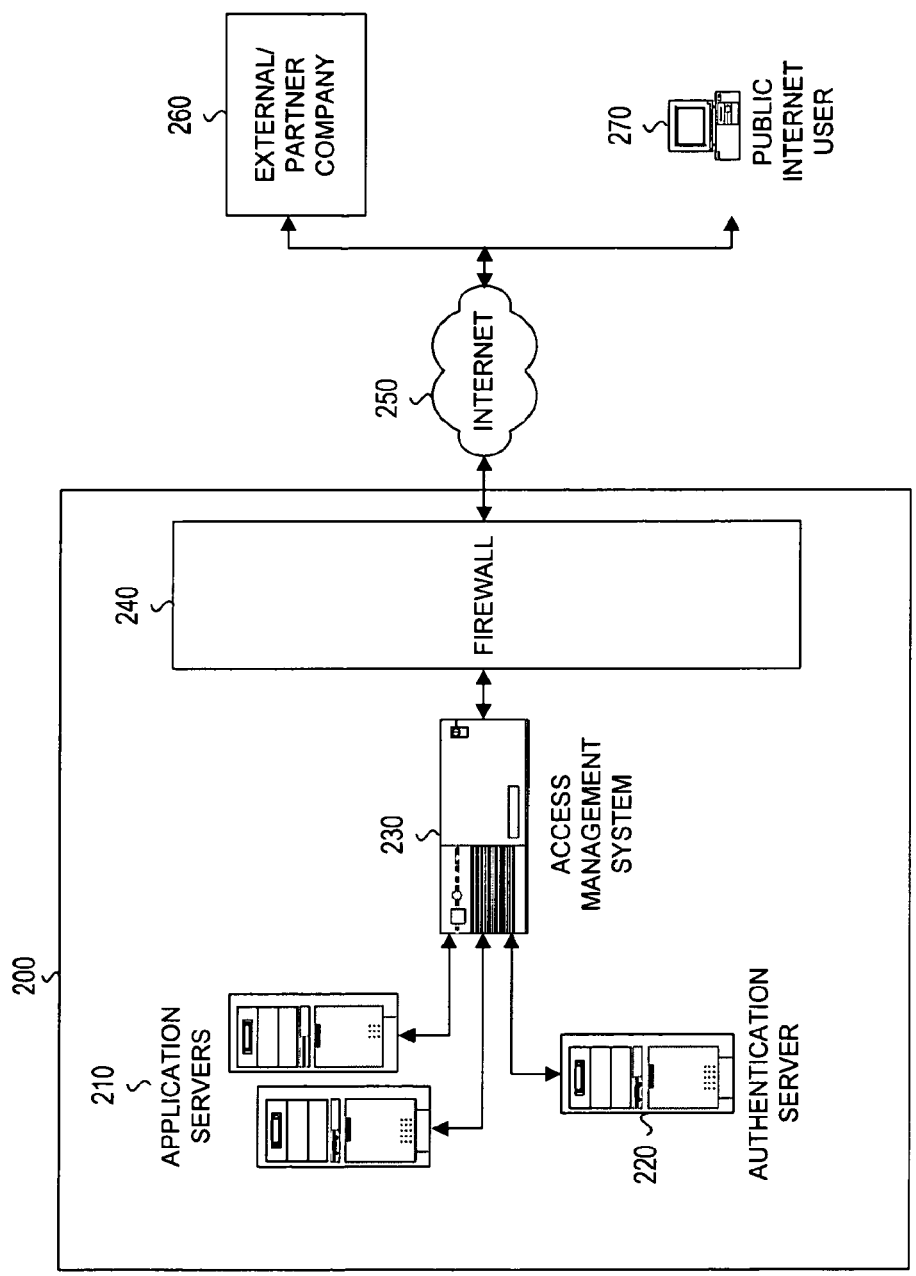
FIG. 2 illustrates an exemplary system architecture of a network connecting to the Internet through two layers of network protection equipment, according to one embodiment.

FIG. 2 illustrates an exemplary system architecture of a network 200 (or network segment) connecting to the Internet 250 through at least two layers of network protection equipment. The network 200 may be internal to a location or facility (e.g. corporate network). The network 200 as illustrated includes two layers of network security: application servers 210, and an authentication server 220. An access management system (AMS) 230 and a firewall 240 provide protection for the network 200 (protected network/network segment). The application servers 210 and the authentication server 220 are connected to the AMS 230 which is connected to the Internet 250 through the firewall 240. An external/ partner company 260 and/or a public Internet user 270 are also connected to the Internet 250. An exemplary operating scenario may be that an operator of the network 200 (e.g., company) desires to enable the external/partner company 260 to access the application servers 210 while blocking the public Internet user 270. It should be understood that the exemplary system architecture is a simplified architecture for illustrative purposes. That is, system architecture is likely to include many more servers, external and partner companies, and public Internet users.

The firewall 240 may provide traditional proxy/firewall protection based on simple packet rules. The typical proxy/ firewall will block most or all external intruders, while allowing users within the company to access internal resources as well as resources connected to the Internet 250. The AMS 230 provides for authenticated, secure access to internal server equipment (e.g., application servers 210) by utilizing policies established by, for example, a system administrator. The policies define the use of more complex, multi-layer packet filtering rules, along with a means for authenticating users wishing to access resources within the company. The AMS 230 may also perform network address translation based on policies defined (e.g., authenticated users).

FIG. 3 illustrates an exemplary policy based NAT map 300. The NAT map 300 is divided by user 310 (identified by source IP address at a given time) and for each user 310 external IP addresses 320 are associated with internal IP addresses 330 for the internal resources. Note that different users may access internal resources with different external IP addresses 320 but having the same internal IP address (e.g., 198.76.29.2 for user 1 and 198.76.29.5 for user 2 both translate to 10.33.96.5) where the resource resides. It is also possible that the same external IP address can be used by different users to equate to different internal addresses (not illustrated). That is, utilizing the user (destination of the packet) in the NAT map provides flexibility. The exemplary policy based NAT map 300 utilizes users and maps or associates different externally known IP addresses to internal IP addresses for each internal resource.

Figure 4:
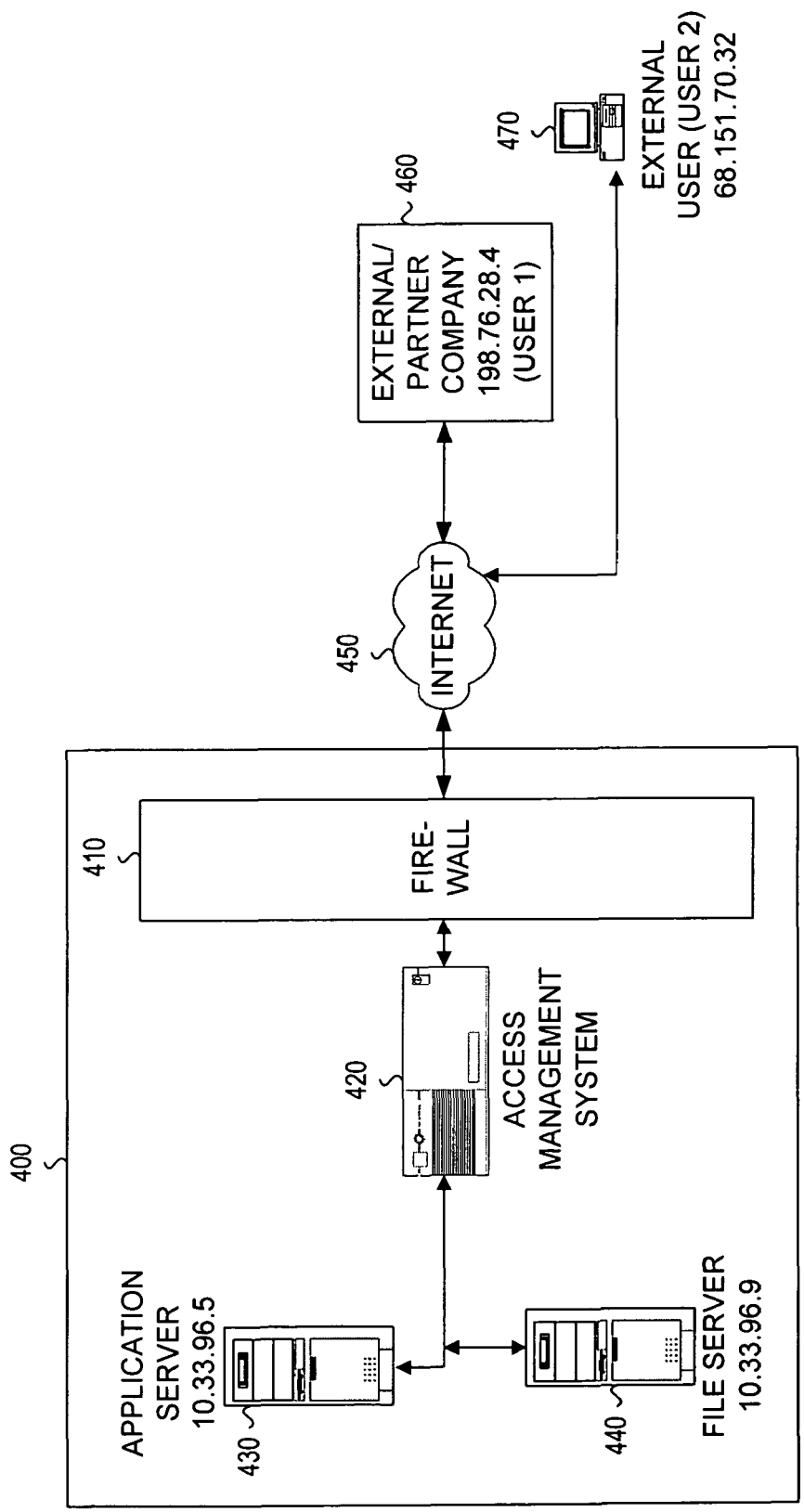
FIG. 4 illustrates an exemplary network utilizing an access management system (AMS), according to one embodiment.

FIG. 4 illustrates an exemplary network (or network segment) 400. It should be noted that there are similar components in both the exemplary network 400 and the exemplary network 200 of FIG. 2 (e.g., firewall, AMS). The similar components are referred to by different reference numbers in each of the figures to illustrate that they may be different embodiments. The network 400 includes a firewall 410, an AMS 420, an application server 430, and a file server 440. The network 400 communicates via the Internet 450 with an external/partner company 460 and an external user 470. The AMS 420 utilizes the NAT map 300 for network address translations. Initially it is pointed out that the AMS 420 authenticates a user at the external/partner company 460 and the external user 470 prior to the users accessing anything with the network 400. According to one embodiment, user authentication may involve logging into a Web-Page hosted by the AMS 420 and entering a user name and password. Other methods of authentication, familiar to those skilled in the art, can be used.

We will now discuss an embodiment of network address translation for communications with this network 400 with respect to the NAT map 300 of FIG. 3. The user at the external/partner company 460 accesses the application server 430 by transmitting packets having an externally known IP address (198.76.29.2) as the destination address. The user transmitting the packets is determined based on the source address of the packets (198.76.28.4). The AMS 420 then utilizes the NAT map 300 to find the externally known IP address 320 for that particular user 310 to determine the internal IP address 330 (10.33.96.5). The AMS 420 accordingly translates the destination address on all packets with this flow from 198.76.29.2 to 10.33.96.5 and the packets are forwarded to the application server 430. Likewise, when the external user 470 (68.151.70.32) transmits packets to the file server 440 utilizing the externally known IP address (198.76.29.6) the AMS 420 then finds the externally known IP address 320 for that particular user 310 and translates it to the internal IP address 330 (10.33.96.9).

Packets in the return flow (from application server 430 or file server 440) have their source address translated from local address (10.33.96.5 and 10.33.96.9 respectively) to the externally known address (198.76.29.2 and 198.76.29.6 respectively based on the user the packet is destined for). The AMS 420 determines the user by looking at the destination IP address. TCP/UDP port numbers are also mapped, as necessary, in a similar fashion. In this way, the user at the external/partner company 440 has no direct knowledge of the host IP addresses internal to the company and cannot directly access hosts within the company.

FIGS. 5A and 5B illustrate an exemplary policy based NAT map 500 for User 1 (FIG. 5A) and User 2 (FIG. 5B). Although shown as separate tables, these maps may exist in a contiguous table and are simply shown as separate figures for convenience. Referring to FIG. 5A, the first column contains external user IP addresses 510, the second column contains external resource IP addresses 520, the third column contains internally mapped user IP addresses 530, the fourth column contains internally mapped resource IP addresses 540, and the fifth column specifies the resource name 550, as known to the device implementing the policy based NAT.

Referring back to FIG. 4, we will now discuss network address translation for communications with network 400 with respect to the policy based NAT map 500 of FIGS. 5A and 5B. For a flow from User 1 to Resource 1, the user will use an external IP address (198.76.28.4) as the originating source address and will use an external resource address (198.76.29.2) as the destination address. When the first packet of the flow traverses the device implementing the policy based NAT, the device can identify the user and the flow ID of the user and will use the map selector to select address maps for the internal user's IP address (10.33.96.2) as well as the internal resource address (10.33.96.5). These address maps would be used for translation of all subsequent packets pertaining to this flow.

Referring to FIG. 5B, User 2 bearing the IP address of 68.151.70.32 goes through a different address map for translating the external user IP address and the external resource IP address to access the same Resource 1. The ability to select different address maps based on user parameters results in a policy based NAT.

When used herein the term policy refers to a set of access or security rules associated with one or more parameters of a user including, but not limited to, group membership, level of authorization or clearance, current network address, time of day, or location. Policies allow users access to certain network resources, and deny them access to other resources, either temporarily (e.g. for time of day based rules or location based rules) or permanently (level of authorization or clearance). In one embodiment, a user logs onto a system with a user ID and a password, and based on the policies associated with that user, they receive access to, or are denied access to, certain network resources. Other mechanisms can be used to determine which policies are applicable, including determinations based on information transmitted from the user.

According to one embodiment, an AMS may utilize a NAT map where the user address map and the resource address map can be divided into internal maps and external maps. That is, the NAT map may include a user address map as well as a resource address map.

Figure 6:
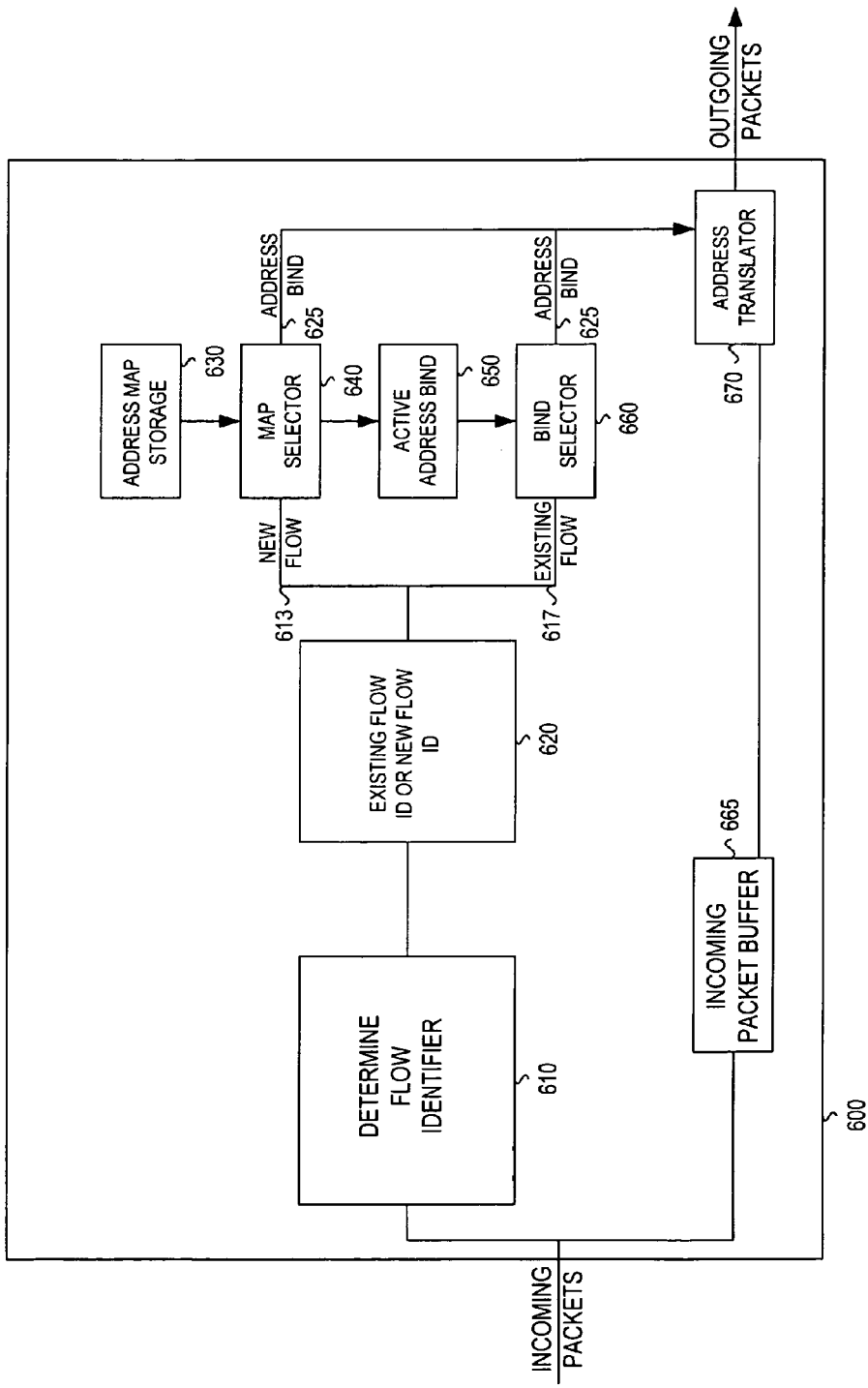
FIG. 6 illustrates an exemplary policy-based network address translation processor, according to one embodiment.

FIG. 6 illustrates a policy based NAT processor 600 that is able to perform policy based address translation. Referring to FIG. 6, when an incoming packet arrives at the policy based NAT processor 600, the flow identifier is determined 610 from the packet. A determination 620 of whether the packet establishes a new flow 613 or is part of an existing flow 617. If the packet constitutes the start of a new flow 613, the flow identifier is directed to a map selector 640 which looks up the address map storage 630, uses appropriate policies pertaining to the user and resource being accessed (and other policy determining parameters) and identifies an address bind 625 that should be applied to the flow. This address bind may be stored into the active address bind 650 for subsequent use. Subsequent packets of the flow may also be subject to the same translation using the same address bind(s) applied to address translator 670. Address translator 670 may use address bind 625 to translate the incoming packet buffer 665 and perform the appropriate address translations on the incoming packet to generate an outgoing packet.

In the event that the incoming packet belongs to an existing flow 617, the bind selector 660 will look up the active address binds 650 against the existing flow ID and determine the appropriate address bind to be applied for the flow associated with the incoming packet.

For flows originating from the internal network to the external network, the AMS may utilize a particular policy based NAT table. Similarly, for flows originating from the external network to the internal network, a different policy based NAT table may be utilized.

For example, if an internal user wishes to access an external web server (an external resource) and has a specific IP address they use for the web server, the internal user address map may identify the resource associated with the unique IP address as an external resource. The outside resource address map may then identify the common IP address for that resource.

NAT address maps may be generated automatically, and they may optionally be edited by a system administrator. In addition, the administrator may set policies for the generation and/or selection of NAT address maps. The particular NAT address map that is used at any given time may depend on the policy that applies to the particular packet flow that is being routed. For example, the NAT resource address maps are typically generated by the AMS at the time of resource definition. User address maps may be automatically generated from policies established during system configuration, but may also be edited manually to fine tune policies. According to one embodiment, default NAT address maps are generated during the initialization and configuration of the AMS.

Computer program instructions to implement a software embodiment of the present invention may be stored in a computer program memory or on a computer readable carrier such as a disk, memory stick, portable memory device, communications signal or carrier wave. The instruments may be carried out in any computer programming language.

The many features and advantages of the invention are apparent from the detailed specification. Since numerous modifications and variations will readily occur to those skilled in the art, it is not desired to limit the invention to the exact construction and operation illustrated and described. Accordingly, all appropriate modifications and equivalents may be included within the scope of the invention.

We claim:

1. A method for applying an access rule to select a user based network address translation maps for accessing an internal network from an external network, the method comprising:
    (a) authenticating, by an access management system executing on a device deployed between an external network and an in internal network, a first external user of a plurality of external users;
    (b) selecting, by the access management system based on an access rule associated with one or more parameters of the first external user, a first network address translation map from a plurality of different network address translation maps of the plurality of external users; and
    (c) determining, by the access management system from the first network address translation map selected for the first external user, an internal internet protocol (IP) address of a resource to be accessed by the first external user.

2. The method of claim 1, wherein step (a) further comprises authenticating, by the access management system, the first external user prior to the first external user accessing resources on the internal network.

3. The method of claim 1, wherein step (b) further comprises selecting the first network address translation map from the plurality of different network address translation maps, based on the access rule associated with an external network address of the first external user.

4. The method of claim 1, wherein step (b) further comprises selecting the first network address translation map from the plurality of different network address translation maps, based on the access rule associated with a time of day of access by the first external user.

5. The method of claim 1, wherein step (b) further comprises selecting the first network address translation map from the plurality of different network address translation maps, based on the access rule associated with a location of the first external user.

6. The method of claim 1, wherein step (b) further comprises selecting the first network address translation map from the plurality of different network address translation maps, based on the access rule associated with a level of authorization.

7. The method of claim 1, wherein step (c) further comprises selecting the first network address translation map comprising a user address map and a resource address map.

8. The method of claim 1, wherein step (c) further comprises determining from the first network address translation map selected for the first external user an internal IP address on the internal network for the first external user.

9. The method of claim 1, further comprising translating, by the device using the first network address translation map selected for the first external user, an external source IP address of a packet received from the external user to an internal user IP address and an external destination IP address of the packet to the internal internet protocol (IP) address of the resource.

10. The method of claim 1, wherein step (c) further comprises determining the internal internet protocol (IP) address of the resource to be accessed by the first external user, the internal IP address of the resource for the first external user is different than a second internal IP address for the same resource for a second external user.

11. A method for using policies to apply a user specific address bind for accessing an internal network from an external network, the method comprising:
    (a) determining, by a processor deployed between an external network and an internal network, a flow identifier from a packet received by the processor from an external user;
    (b) determining, by the processor via the flow identifier, that the packet is part of a new flow of network traffic between the external user and a resource of the internal network; and
    (c) applying, by the processor one or more policies pertaining to the external user and the resource being accessed, to identify a user specific address bind to apply to the new flow of network traffic, the user specific address bind comprising a first mapping of a user internal internet protocol (IP) address to an external source IP address of the packet and a second mapping of an internal IP address of the resource to an external destination IP address of the packet.

12. The method of claim 11, further comprising translating, by an address translator, the received packet using the user specific address bind to generate an outgoing packet to be transmitted on the internal network.

13. The method of claim 11, wherein step (a) further comprises determining, by the processor, the flow identifier from a source IP address and a destination IP address of the packet.

14. The method of claim 11, wherein step (a) further comprises determining, by the device, the external user from a source IP address of the packet.

15. The method of claim 11, wherein step (c) further comprises determining, by the processor, a network address translation map selector from the flow identifier.

16. The method of claim 11, further comprising determining, by the processor, via a second flow identifier for a second packet, that the second packet is part of an existing flow of network traffic of the external user.

17. The method of claim 16, further comprising looking up, by a bind selector, a plurality of active address binds against the second flow identifier.

18. The method of claim 17, further comprising determining, by the bind selector based on the one or more policies, an appropriate address bind from the plurality of active address binds.

19. The method of claim 11, further comprising utilizing, by the processor, a first policy based network address translation table for flows originating from the internal network that is different from a second policy based network address translation table utilized for flows originating from the external network.

20. The method of claim 11, forming, by the processor, the user specific address bind from a network address translation map selected for the external user from a plurality of different network address translation maps of a plurality of external users based on an access rule associated with one or more parameters of the external user.

* * * * *